(12) United States Patent
VanBlon et al.

(10) Patent No.: US 11,302,322 B2
(45) Date of Patent: Apr. 12, 2022

(54) IGNORING COMMAND SOURCES AT A DIGITAL ASSISTANT

(71) Applicant: Lenovo (Singapore) Pte. Ltd., Singapore (SG)

(72) Inventors: Russell Speight VanBlon, Raleigh, NC (US); Roderick Echols, Chapel Hill, NC (US); Ryan Charles Knudson, Durham, NC (US); Bradley Park Strazisar, Cary, NC (US); John Polischak, Clayton, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 162 days.

(21) Appl. No.: 16/687,386

(22) Filed: Nov. 18, 2019

(65) Prior Publication Data

US 2021/0151047 A1 May 20, 2021

(51) Int. Cl.
| | | |
|---|---|---|
| *G06F 16/9032* | (2019.01) | |
| *G10L 15/22* | (2006.01) | |
| *G10L 17/02* | (2013.01) | |
| *G10L 25/51* | (2013.01) | |

(52) U.S. Cl.
CPC ........ *G10L 15/22* (2013.01); *G06F 16/90332* (2019.01); *G10L 17/02* (2013.01); *G10L 25/51* (2013.01); *G10L 2015/227* (2013.01)

(58) Field of Classification Search
CPC ... G10L 15/22; G10L 17/02; G10L 2015/227; G10L 25/51; G06F 16/90332
See application file for complete search history.

(56) References Cited

U.S. PATENT DOCUMENTS

| | | | |
|---|---|---|---|
| 2006/0150115 A1* | 7/2006 | Jin | G06F 3/0482 |
| | | | 715/764 |
| 2014/0207451 A1* | 7/2014 | Topiwala | G10L 15/32 |
| | | | 704/235 |
| 2015/0304634 A1* | 10/2015 | Karvounis | G06T 7/277 |
| | | | 348/46 |
| 2018/0192104 A1* | 7/2018 | Splaine | H04N 21/44213 |
| 2018/0247648 A1* | 8/2018 | Nadimpalli | G10L 15/26 |
| 2019/0007673 A1* | 1/2019 | Karvounis | G06K 9/00201 |
| 2019/0088257 A1* | 3/2019 | Shah | G06F 3/167 |
| 2019/0094955 A1* | 3/2019 | Zuber | G01S 15/86 |
| 2019/0108834 A1* | 4/2019 | Nelson | G10L 15/22 |
| 2019/0341034 A1* | 11/2019 | Dunning | G10L 15/02 |
| 2020/0125952 A1* | 4/2020 | Mosayyebpour | G06N 3/08 |
| 2020/0133594 A1* | 4/2020 | Parthasarathy | G10L 17/00 |
| 2020/0153646 A1* | 5/2020 | Leblang | G06F 3/167 |
| 2020/0401211 A1* | 12/2020 | Lympouridis | G02B 27/0176 |
| 2020/0402516 A1* | 12/2020 | Trim | G01S 5/28 |
| 2021/0056963 A1* | 2/2021 | Lee | G06F 16/68 |

* cited by examiner

*Primary Examiner* — Daniel C Washburn
*Assistant Examiner* — Oluwadamilola M Ogunbiyi
(74) *Attorney, Agent, or Firm* — Ference & Associates LLC

(57) ABSTRACT

One embodiment provides a method, including: receiving, at an information handling device comprising a digital personal assistant, a command; determining, utilizing at least one sensor operatively coupled to the information handling device, a source of the command comprises a source to be ignored; and ignoring, responsive to determining the source is to be ignored, the command. Other aspects are described and claimed.

15 Claims, 3 Drawing Sheets

IGNORING COMMAND SOURCES AT A DIGITAL ASSISTANT

BACKGROUND

Information handling devices ("devices"), for example smart phones, tablet devices, smart speakers, laptop and personal computers, and the like, may be capable of receiving command inputs and providing outputs responsive to the inputs. A common method of providing input to a device is by providing voice input to the device (e.g., to a voice input module embodied in a personal assistant, etc.). Generally, regardless of the source of the voice input (e.g., a proximate human user, another non-human source, etc.), a device may process the received input and provide a responsive output.

BRIEF SUMMARY

In summary, one aspect provides a method, comprising: receiving, at an information handling device comprising a digital personal assistant, a command; determining, utilizing at least one sensor operatively coupled to the information handling device, a source of the command comprises a source to be ignored; and ignoring, responsive to determining the source is to be ignored, the command.

Another aspect provides an information handling device, comprising: a digital personal assistant; a processor; a memory device that stores instructions executable by the processor to: receive, at the digital personal assistant, a command; determine, utilizing at least one sensor operatively coupled to the information handling device, a source of the command comprises a source to be ignored; and ignore, responsive to determining the source is to be ignored, the command.

A further aspect provides a product, comprising: a storage device that stores code, the code being executable by a processor and comprising: code that receives, at an information handling device comprising a digital personal assistant, a command; code that determines, utilizing at least one sensor operatively coupled to the information handling device, a source of the command comprises a source to be ignored; and code that ignores, responsive to determining the source is to be ignored, the command.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
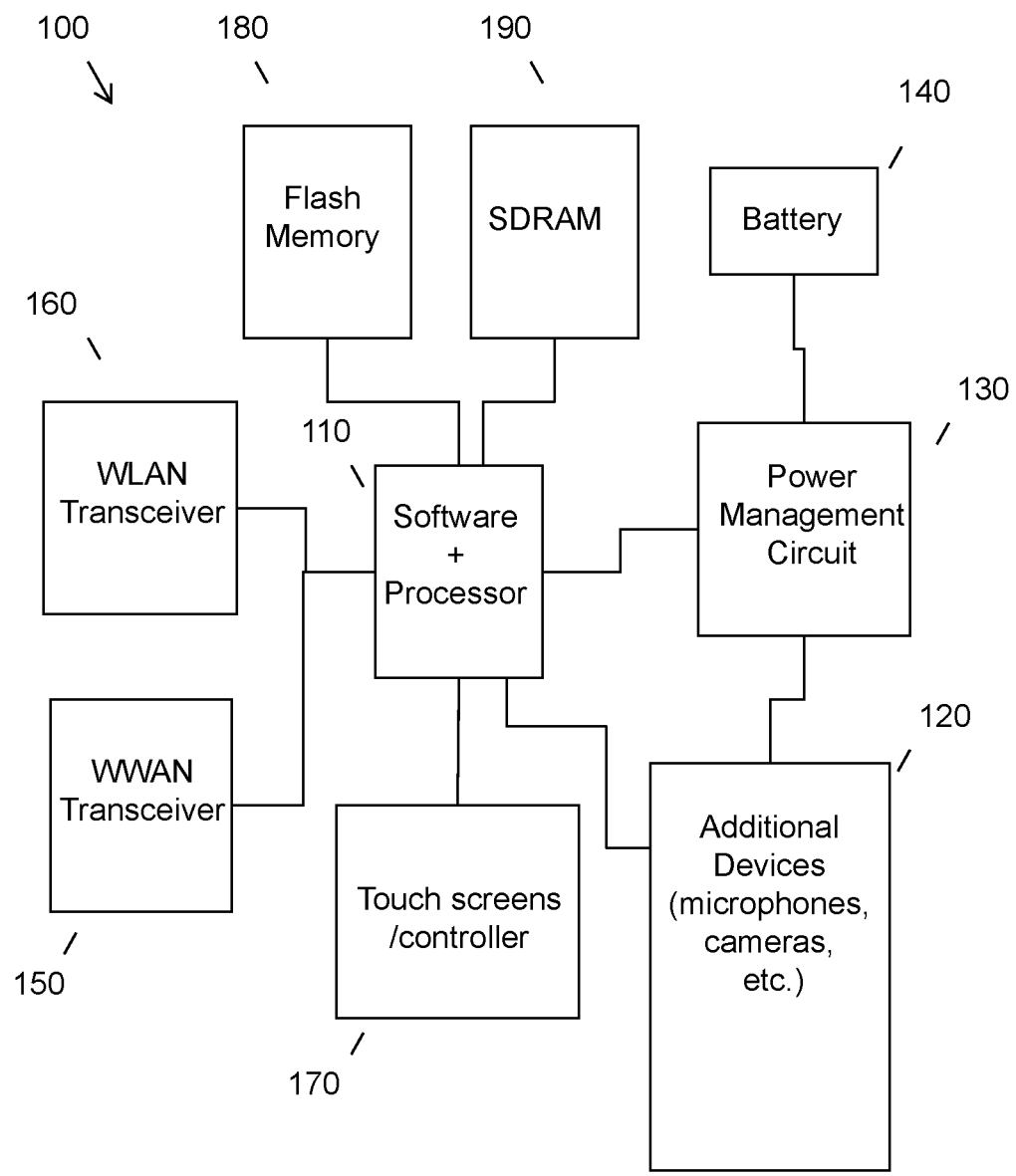
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Audible input is becoming increasingly more accepted by information handling devices as a viable form of input. For example, a digital personal assistant can recognize when a user is providing a wake word and command following the wake word. A system may then complete an action or provide a response as a result of the command provided by the user. As the use of "hands-free" technology becomes more widely accepted, issues may arise in determining who or what is providing a command to an information handling device. False-positives, or commands a device detects that were not intended to activate a system or commands that a device detects that a user of the device did not intend to activate a system, can cause a system to perform an action or provide a response to a command that was not provided or intended by the user. For example, television commercials promoting audible input devices and potential commands may activate a digital personal assistant. The digital personal assistant may then perform an action in response to the command provided by the television commercial leading to undesired actions. Performing tasks or providing responses to false-positive commands must be negated to keep a system from seemingly acting on its own.

Conventionally, as an attempt to overcome false-positives, systems try to create voice signatures for a user that are then detected by a digital personal assistant. Creating a voice signature will cause a system to respond only to the recognized voice programmed into a device. This approach may work in single person homes that only receive commands from a single user, but within areas that an information handling device may interact with a plurality of users, creating a voice signature for everyone is time consuming and cannot be accurately completed. Additionally, if more than one user is talking while a specific user is providing a command, a system may try to implement terms from each recognized voice into a command. This will lead to inaccurate responses being provided by the digital personal assistant or may result in not receiving a response at all.

Further, companies have tried to implement a specific type of audio to be provided by television and radio commercials when using a particular wake word. This attempt may be successful when a commercial is directed towards a digital personal assistant by using a wake word assigned to the digital personal assistant. However, in situations where unintentional use of a word that sounds like the wake word or another phrase that triggers the device without an explicit mention of the wake word, the digital personal assistant will still attempts to perform a task even though an action is not desired by a user.

Accordingly, described herein is a system and method that may determine the source of command directed to a digital personal assistant and ignore commands received from sources that are identified as sources to be ignored. For example, the system may recognize that a non-human source is providing a command, and based on this recognition, a system not provide a response to the command. In other words, a system may differentiate between human voice input and artificial voice inputs and only perform tasks when it is recognized that it is a human or user proximate to the device that is providing the command. A system may determine who or what is providing a command from the granularity associated with the voice providing the command. Granularity of sound between a present human voice and an artificial voice, for example, a voice provided via a television or other electronic device, is indistinguishable by the human ear but may be recognized by a computer system. In situations where the audible input may be determined to have been provided by a non-human source, a system may not complete a task responsive to the command.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
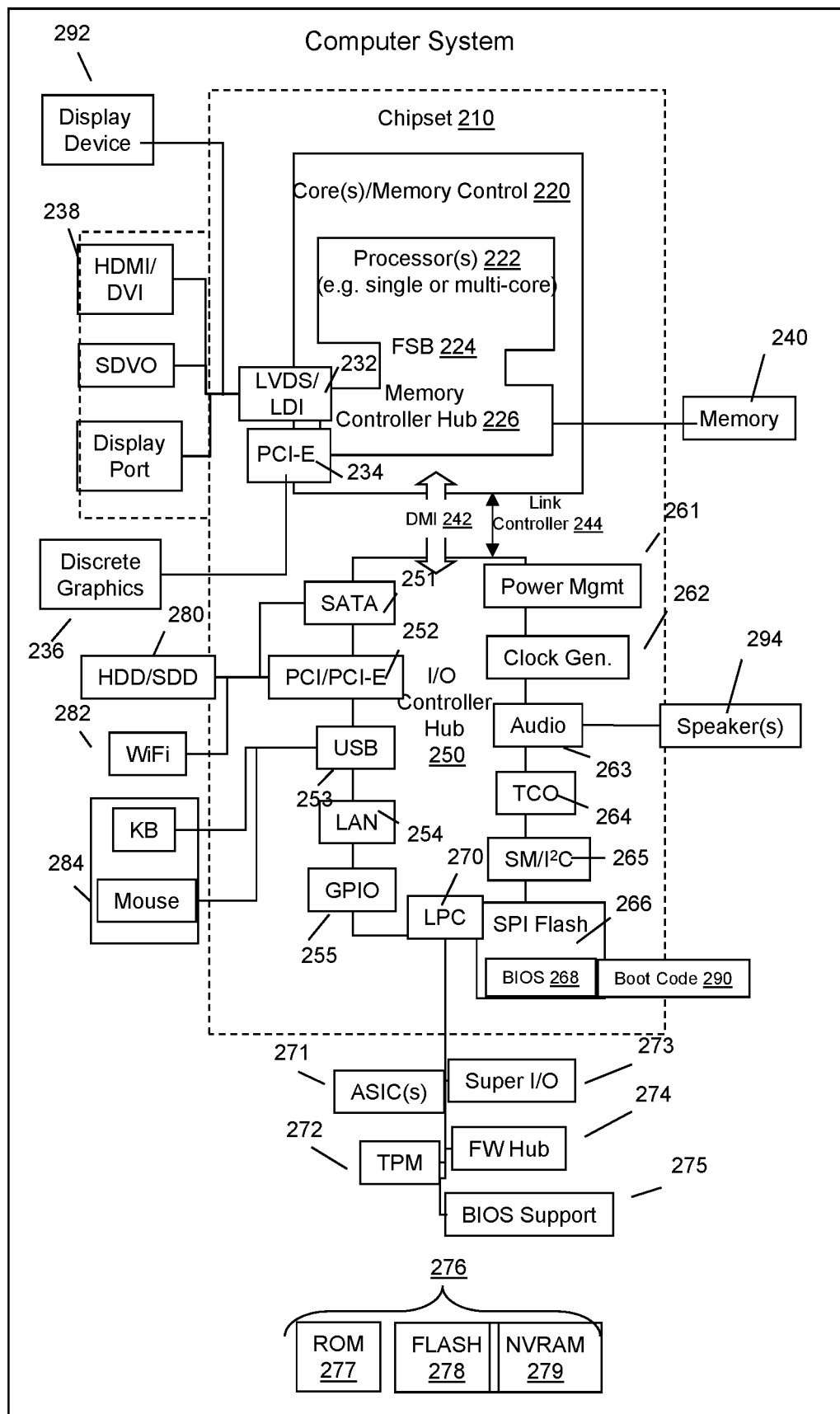
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, smart speakers, personal computer devices generally, and/or electronic devices which may include digital assistants that a user may interact with and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
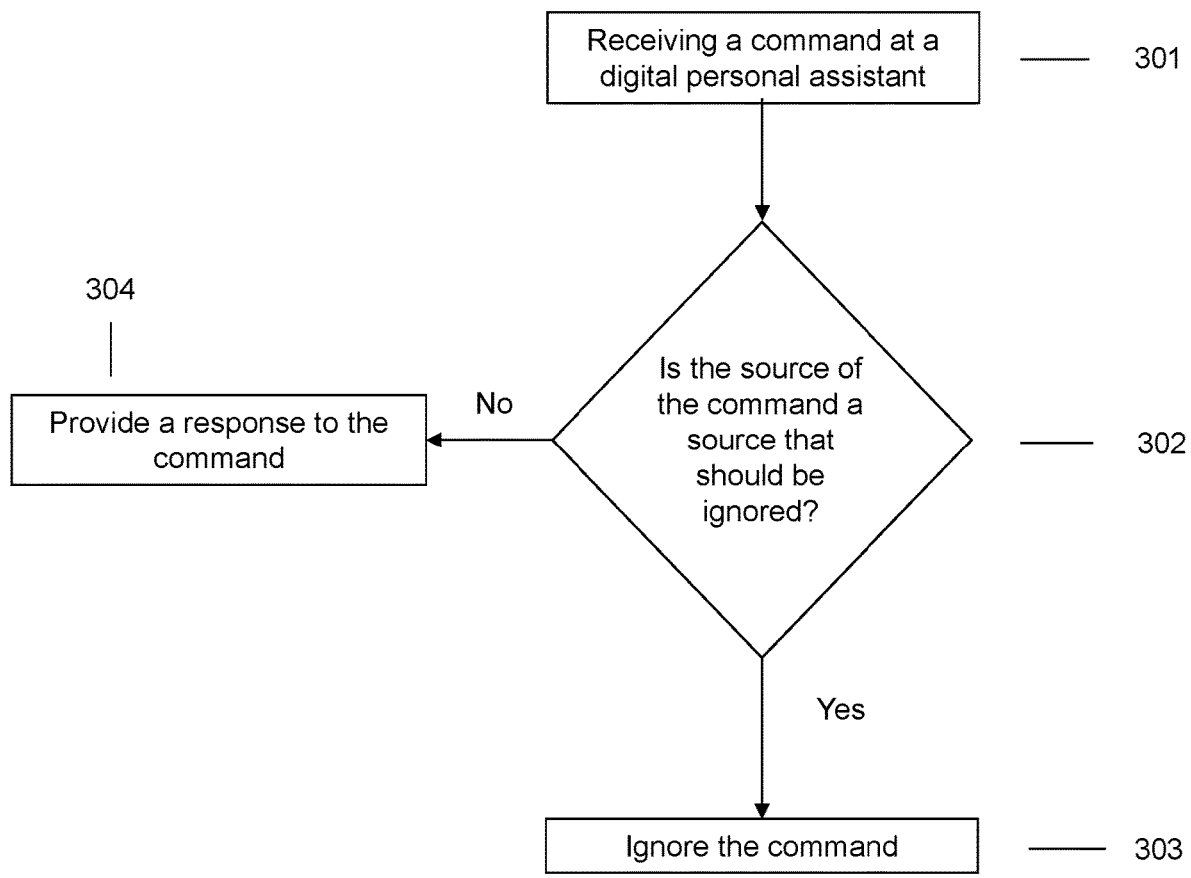
FIG. 3 illustrates an example method of determining the source of command directed to a digital personal assistant and ignoring commands received from sources that are identified as sources to be ignored.

Referring now to FIG. 3, a system and method is described for determining the source of command directed to a digital personal assistant and ignoring commands received from sources that are identified as sources to be ignored. At 301, a system may receive a command at a digital personal assistant (DPA). For ease of readability, audible inputs will be discussed as the source of the commands to the DPA. However, other modalities of input may also be accepted by a DPA, for example, text input, gesture input, and the like. Receipt of a command at the digital personal assistant may be recognized because the DPA is activated, for example, due to receipt of a wake word. Conventionally, a wake word is a programmed term that a digital personal assistant may recognize to draw the attention of the digital personal assistant to the user, or activate the digital personal assistant, prior to the user providing a command. For example, a wake word, or phrase, such as, "hey computer" may be used to draw the attention of the DPA, and following the "hey computer," the user may instruct to the DPA to complete a task.

At 302, a system may determine who or what is providing the wake word and potential command. In determining the source of the wake word and command, the system may utilize a processor to determine if the source is a human directing a command to the digital personal assistant or a non-human source or other source that should be ignored. Sources to be ignored may include non-human sources (e.g., electronic device sources, animal sources, etc.), children, or the like. Even though the term "non-human sources" is used herein, it should be understood that the actual provision of the command may be completed by a human; however, the command is conveyed via an electronic device. In other words, a non-human source does not negate the possibility that a human could be speaking within a television commercial and provide a command that would normally activate a digital assistant. However, since this command is conveyed through the television, the system would recognize this as a non-human source.

To determine a source of the command, and, therefore, whether the source is a source that should be ignored, the system may employ one or a plurality of techniques, for example, using one or more sensors operatively coupled to the information handling device. One technique includes identifying the audible granularity of the command, for example, using an audio capture sensor. Granularity measures the amount of samples per second that are present in a line of speech. The amount of samples per second for an artificial sound is less than that of a human voice. Audible granularity of speech provided from a human and or artificially (e.g., from a speaker, digitally, etc.) are provided at a different number of samples per second. The difference between the analog (i.e., human) sound and the digital (i.e., non-human) sound audible granularity is inaudible to human hearing. In other words, a human cannot make this differentiation by ear because the amount of samples per second for both cases is greater than the range of detection for a human. However, computers are able to differentiate between the granularity of the sources, thereby allowing the system to determine which source is speaking. This differentiation of speech may be useful when determining the source of an audible command directed to a personal digital assistant in an attempt to negate false-positives.

To determine if a source is human or non-human the system may analyze the command to determine an audible granularity of the command. The audible granularity may then to be analyzed and compared to a threshold value. If the audible granularity, or number of samples per second, of the command is greater than a determined threshold value, the system may identify the source as a human source. On the other hand, if the audible granularity is less than a predetermined threshold value, the system may identify the source as a non-human source. In other words, a non-human source will result in a command having an audible granularity less than a predetermined threshold value, whereas a human source will result in a command having an audible granularity greater than the threshold value.

Another technique includes using an image capturing sensor or device (e.g., camera) to track humans and non-human sources present in an environment. For example, the camera may utilize standard techniques to notice when a human(s) move in and out of a space containing a DPA. Additionally or alternatively, a system may utilize a sensor that can detect heat signatures of humans present and their locations within the environment. The image sensor and/or heat sensor can determine whether a human is proximate to the information handling device. For example, if a heat signature is identified, the system may identify that a human is in the environment. As another example, using image processing techniques the system can analyze an image to identify if there are humans within the image. In other words, these sensors may assist in determining who or what provided a command by identifying whether a human is in the location and where within the location the human is located.

Similarly, the system may use a sensor that can produce pings, for example, sonar pings. Using pings the system can generate a mapping of the environment. The original state, or state of the environment without any users within the environment, of an environment may be saved. Then as the sensor emits continuous pings, a mapping of the environment may be created. The new mappings may be compared to the original map to identify any changes. These changes may then be attributed to the presence of one or more humans in an environment. The use of an image sensor, audible sensor, ping sensor, or the like, are non-limiting examples of potential sensors that may be operatively coupled to the information handling device. If, using these sensors, no humans are detected within the environment, the system may determine that the command was provided by a non-human source. Sources identified as non-human may be identified as a source to be ignored.

The sensors may also be used to identify additional details about the source providing the input. For example, the sensors may assist in identifying features of any human within the environment, for example, a height of the human, a location of the human with respect to the DPA, and the like. These features may be utilized to determine if the source is one that should be ignored. For example, the system may be set that commands provided by a child should be ignored. Thus, the height of the human may provide an indication that the human may be a child. Alternatively, the sensor information may be compared to features of a known human and features deviating from the known human features may indicate that the source is one that should be ignored. Thus, in an embodiment, the use of sensors may permit a user to set restrictions on who may provide commands to a system. Sensors may be able to determine variables associated with humans within an environment (e.g., height of humans) and restrict command acceptance because of the at least one selected variable.

Another technique for determining that a source should be ignored includes the recognition of a particular feature within the command or output associated with the command. The feature may indicate that output provided after the feature should be ignored. The feature may be a tone that is included within the output including the command. The tone may be inaudible to a human but detectable by the system. This tone may indicate that the source is non-human and may, therefore, cause the system to ignore any commands received after the tone. The system may then ignore any input received for a predetermined length of time. Alternatively, the output may include a non-ignore feature after the command is finished that would indicate that the system can resume listening.

When a system determines that an audible input picked up by the digital personal assistant is not supplied by a human, or otherwise provided by a source that should be ignored, at 303, a system does not provide a response to command or otherwise ignore the command. For example, and referring back to a previous example, if the wake phrase for a digital personal assistant is "hey computer," and a television present in the same environment as a DPA provides this phrase, for example within a commercial, a system may recognize that the source of the command is artificial. The system may identify that the source is non-human due to the granularity of the speech, that no human is within an area to provide a command identified using of a sensor, or otherwise identify that the source is non-human. Once the source is identified as one that should be ignored, the system may not perform any response to the command provided following the wake word provided from the source to be ignored. On the other hand, when the source is determined to be a human providing the wake word and directing a command to the digital personal assistant, a system may perform or provide a response to the command at 304, as with traditional DPA responses.

The various embodiments described herein thus represent technical improvements to conventional methods for DPA responses. Specifically, the system can identify false-positives, or commands provided by a source to be ignored, and ignore any commands provided by the sources that are to be ignored. Instead of requiring voice signatures as with some conventional techniques, the described system can analyze the received command to determine if the source is one to be ignored. Thus, the system is less processing intensive, storage resource intensive, and more user friendly than conventional techniques.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
  receiving, at an information handling device comprising a
    digital personal assistant, a command, wherein the command comprises a wake word corresponding to an activation cue of the digital personal assistant;

determining, utilizing at least one sensor operatively coupled to the information handling device, a source of the command comprises a source to be ignored, wherein the determining comprises determining the source comprises a non-human source by analyzing an audible granularity of the command and identifying the audible granularity is different than an audible granularity attributable to a human source; and ignoring, responsive to determining the source is to be ignored, the command.

2. The method of claim 1, wherein the determining comprises comparing the audible granularity of the command to a threshold value and identifying the source as a source providing digital audio output and a source to be ignored based upon the audible granularity being below the threshold value.

3. The method of claim 1, wherein the determining comprises detecting a tone included in an output including the command, wherein the tone indicates the source is to be ignored.

4. The method of claim 1, comprising detecting, utilizing the at least one sensor, whether at least one user located in proximity to the information handling device.

5. The method of claim 4, wherein the at least one sensor comprises a sensor producing pings; and
wherein the detecting comprises generating a mapping of an environment around the information handling device utilizing the pings produced by the sensor, comparing the mapping generated to a pre-generated mapping of the environment corresponding to the environment with no users, and determining, from the comparison, a user is not located within the environment.

6. The method of claim 4, wherein the at least one sensor comprises a sensor that detects heat; and
wherein the detecting comprises determining a user is not located within the environment based upon output from the sensor.

7. The method of claim 4, wherein the at least one sensor comprises an image sensor; and
wherein the detecting comprises determining a user is not located within the environment based upon output from the sensor.

8. An information handling device, comprising:
a digital personal assistant;
a processor;
a memory device that stores instructions executable by the processor to:
receive, at the digital personal assistant, a command, wherein the command comprises a wake word corresponding to an activation cue of the digital personal assistant;
determine, utilizing at least one sensor operatively coupled to the information handling device, a source of the command comprises a source to be ignored, wherein to determine comprises determining the source comprises a non-human source by analyzing an audible granularity of the command and identifying the audible granularity is different than an audible granularity attributable to a human source; and
ignore, responsive to determining the source is to be ignored, the command.

9. The information handling device of claim 8, wherein the instructions executable by the processor to determine comprises instructions executable by the processor to compare the audible granularity of the command to a threshold value and identify the source as a source providing digital audio output and a source to be ignored based upon the audible granularity being below the threshold value.

10. The information handling device of claim 8, wherein the instructions executable by the processor to determine comprises detecting a tone included in an output including the command, wherein the tone indicates the source is to be ignored.

11. The information handling device of claim 8, comprising instructions executable by the processor to detect, utilizing the at least one sensor, whether at least one user located in proximity to the information handling device.

12. The information handling device of claim 11, wherein the at least one sensor comprises a sensor producing pings; and
wherein the instructions executable by the processor to detect comprises instructions executable by the processor to generate a mapping of an environment around the information handling device utilizing the pings produced by the sensor, compare the mapping generated to a pre-generated mapping of the environment corresponding to the environment with no users, and determine, from the comparison, a user is not located within the environment.

13. The information handling device of claim 11, wherein the at least one sensor comprises a sensor that detects heat; and
wherein the instructions executable by the processor to detect comprise instructions executable by the processor to determine a user is not located within the environment based upon output from the sensor.

14. The information handling device of claim 11, wherein the at least one sensor comprises an image sensor; and
wherein the instructions executable by the processor to detect comprise instructions executable by the processor to determine a user is not located within the environment based upon output from the sensor.

15. A product, comprising:
a storage device that stores code, the code being executable by a processor and comprising:
code that receives, at an information handling device comprising a digital personal assistant, a command, wherein the command comprises a wake word corresponding to an activation cue of the digital personal assistant;
code that determines, utilizing at least one sensor operatively coupled to the information handling device, a source of the command comprises a source to be ignored, wherein the code that determines comprises determining the source comprises a non-human source by analyzing an audible granularity of the command and identifying the audible granularity is different than an audible granularity attributable to a human source; and
code that ignores, responsive to determining the source is to be ignored, the command.

* * * * *